(12) United States Patent
Yao et al.

(10) Patent No.: US 7,596,859 B2
(45) Date of Patent: Oct. 6, 2009

(54) METHOD FOR MAINTAINING ALIGNMENT OF A HARD DISK MICRO-ACTUATOR AND MAGNETIC HEAD WITH RESPECT TO A DRIVE ARM'S SUSPENSION DURING THE CURING PROCESS OF A BONDING AGENT USED IN THEIR COUPLING

(75) Inventors: Minggao Yao, Dongguan (CN); Yiru Xie, Dongguan (CN); Masashi Shiraishi, Kowloon (HK)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 180 days.

(21) Appl. No.: 10/278,250

(22) Filed: Oct. 22, 2002

(65) Prior Publication Data

US 2003/0188421 A1    Oct. 9, 2003

(30) Foreign Application Priority Data

Apr. 9, 2002    (WO) .................... PCT/CN02/00247

(51) Int. Cl.
*B23P 19/04*    (2006.01)
*G11B 5/48*    (2006.01)

(52) U.S. Cl. ................... 29/737; 29/603.06; 29/603.04; 360/244.7

(58) Field of Classification Search .............. 29/603.06, 29/603.03, 603.04, 737; 360/244.7, 291.4, 360/294.4; 156/330
See application file for complete search history.

(56) References Cited

U.S. PATENT DOCUMENTS

| 4,076,869 | A | * | 2/1978 | Flynn ..................... 156/330 X |
| 5,808,835 | A | * | 9/1998 | Fujiwara .................. 360/244.7 |
| 6,201,668 | B1 | * | 3/2001 | Murphy .................... 360/294.4 |
| 6,215,625 | B1 |  | 4/2001 | Carlson .................... 360/244.7 |

FOREIGN PATENT DOCUMENTS

JP    2001-057040    2/2001

OTHER PUBLICATIONS

Tagawa et al., "Submicron Spacing Dynamics for Flying Head Slider Mechanisms using Building Block Approach", IEEE Transactions on Magnetics, vol. Mag-21, No. 5, Sep. 1985.*

* cited by examiner

*Primary Examiner*—A. Dexter Tugbang
(74) *Attorney, Agent, or Firm*—Kenyon & Kenyon LLP

(57) ABSTRACT

A system is disclosed for maintaining proper alignment of a hard disk micro-actuator and magnetic head with respect to a drive arm's suspension during the curing process of the bonding agent used in their coupling. Embodiments may include a system to couple an actuator element to a suspension element comprising: a shim element to be plated at a first location between an actuator element and a suspension element to maintain a relative orientation of the actuator element with respect to the suspension element during a curing process of a bonding agent at a second location between said actuator element and said suspension element.

11 Claims, 8 Drawing Sheets

METHOD FOR MAINTAINING ALIGNMENT OF A HARD DISK MICRO-ACTUATOR AND MAGNETIC HEAD WITH RESPECT TO A DRIVE ARM'S SUSPENSION DURING THE CURING PROCESS OF A BONDING AGENT USED IN THEIR COUPLING

BACKGROUND INFORMATION

The present invention relates to magnetic hard disk drives. More specifically, the present invention relates to a system for maintaining proper alignment in the coupling of a hard disk micro-actuator and magnetic head to a drive arm's suspension during the curing process of the bonding agent.

In the art today, different methods are utilized to improve recording density of hard disk drives. FIG. 1 provides an illustration of a typical drive arm configured to read from and write to a magnetic hard disk. Typically, a voice-coil motor (VCM) 102 is used for controlling the motion, across a magnetic hard disk 106, of an arm 104 of a hard drive. Because of the inherent tolerance (dynamic play) that exists in the placement of a recording head 108 by a VCM 102 alone, micro-actuators 110 are now being utilized to 'fine-tune' head 108 placement, as is described in U.S. Pat. No. 6,198,606. A VCM 102 is utilized for course adjustment and the micro-actuator then corrects the placement on a much smaller scale to compensate for the tolerance of the VCM 102 (with the arm 104). This enables a smaller recordable track width, increasing the 'tracks per inch' (TPI) value of the hard drive (increased drive density).

FIG. 2 provides an illustration of a micro-actuator as used in the art. Typically, a slider 202 (containing a read/write magnetic head; not shown) is utilized for maintaining a prescribed flying height above the disk surface 106 (See FIG. 1). Micro-actuators may have flexible beams 204 connecting a support device 206 to a slider containment unit 208 enabling slider 202 motion independent of the drive arm 104 (See FIG. 1). An electromagnetic assembly or an electromagnetic/ferromagnetic assembly (not shown) may be utilized to provide minute adjustments in orientation/location of the slider/head 202 with respect to the arm 104 (See FIG. 1).

A bonding agent, such as epoxy, may be used to physically couple components, such as a micro-actuator, to other components, such as a magnetic head (slider) or drive arm suspension. Because bonding agents such as epoxy require an amount of time to cure, during which the bonding agent is somewhat fluid, the components to be bonded have an opportunity to physically shift away from their proper relative orientation under the influence of the clamping force necessary for proper bond securement.

It is therefore desirable to have a system for maintaining proper alignment in the coupling of a hard disk micro-actuator and magnetic head to a drive arm's suspension during the curing process of the bonding agent, as well as having additional benefits.

DETAILED DESCRIPTION

Figure 1:
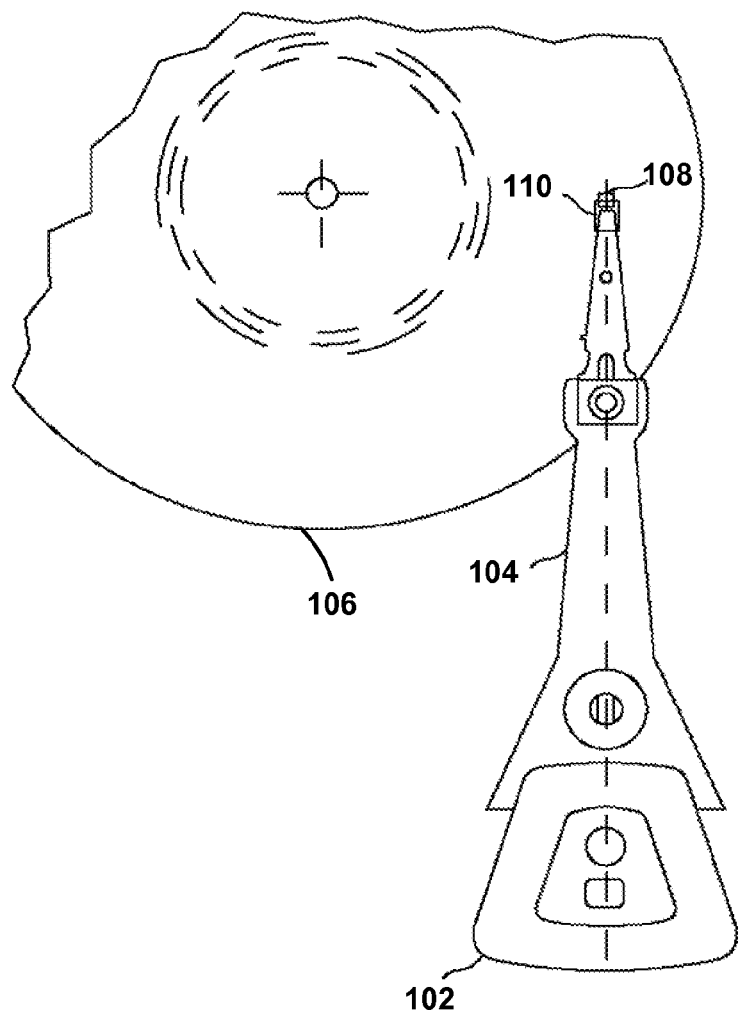
FIG. 1 provides an illustration of a drive arm configured to read from and write to a magnetic hard disk as used in the art.
Figure 2:
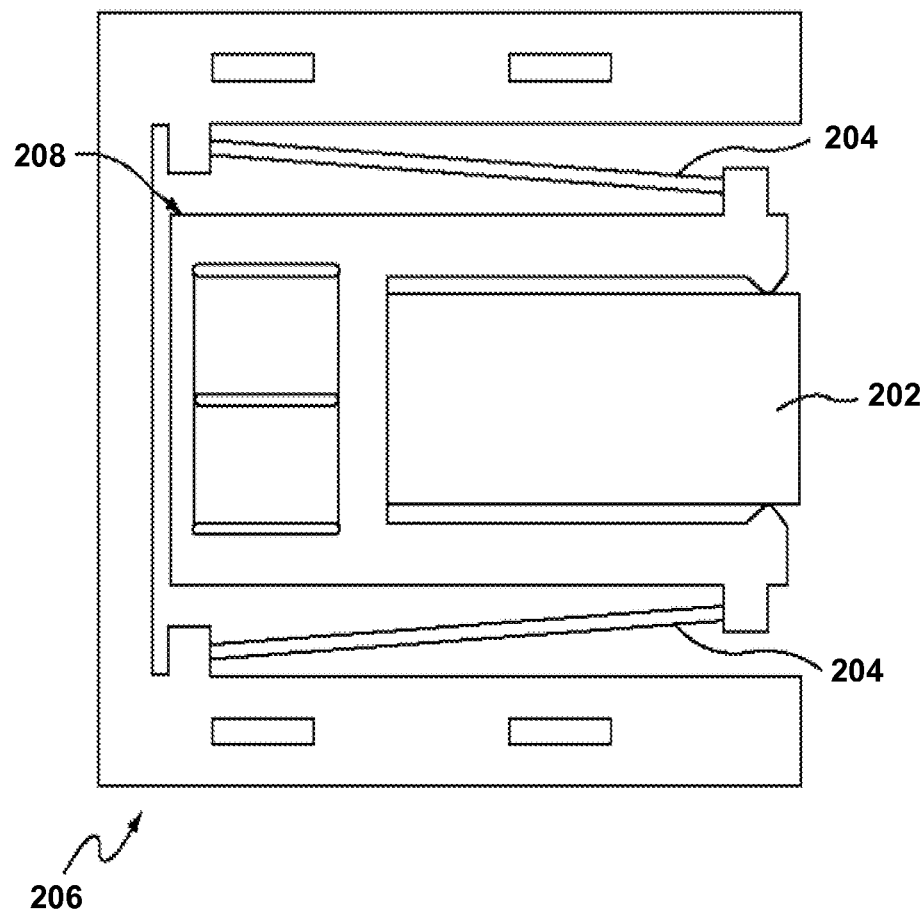
FIG. 2 provides an illustration of a micro-actuator as used in the art.
Figure 3:
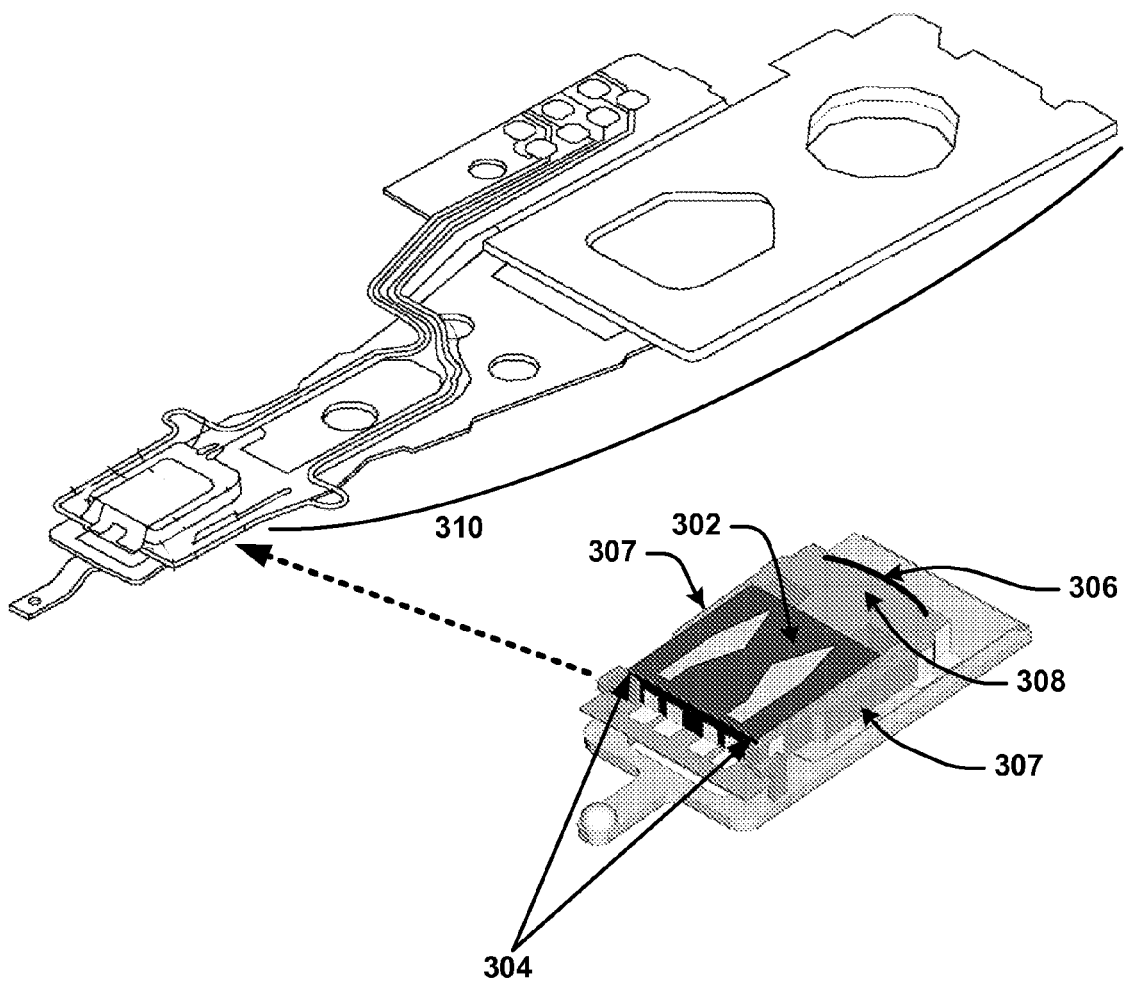
FIG. 3 provides an illustration of a hard disk drive head gimbal assembly (HGA) with a 'U'-shaped micro-actuator under principles of the present invention.

FIG. 3 provides an illustration of a hard disk drive head gimbal assembly (HGA) with a 'U'-shaped micro-actuator under principles of the present invention. In one embodiment, a slider (with read/write head) 302 is bonded at two points 304 to a 'U'-shaped micro-actuator 306. Further, in an embodiment, the 'U'-shaped micro-actuator has a piezoelectric PZT (Piezoelectric Transducer) beam (arm) 307 on each side of a Zirconia support frame (actuator base/bottom arm) 308. As explained below, the micro-actuator is coupled to and supported by an arm suspension 310. In other embodiments, the support frame 308 is made of a metal, such as aluminum, or a polymer, such as polyethylene or polyester.

Figure 4:
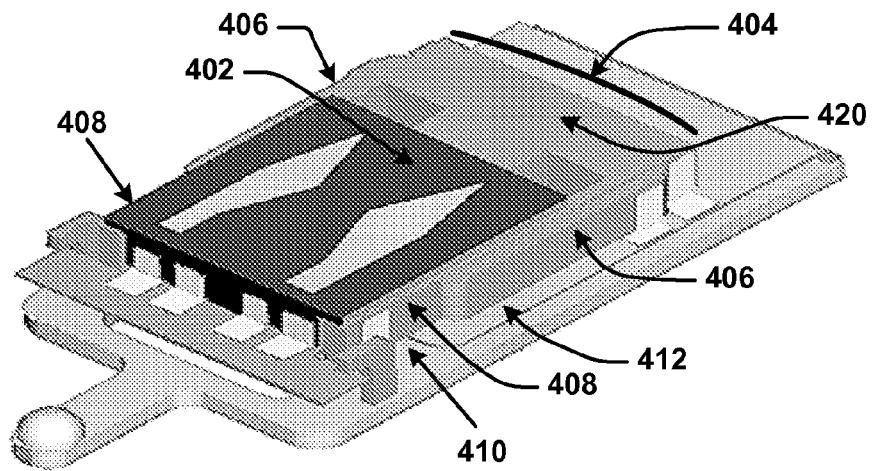
FIG. 4 provides a detailed illustration of a magnetic head (and slider) with a 'U'-shaped micro-actuator under principles of the present invention.

FIG. 4 provides a detailed illustration of a magnetic head (and slider) 402 with a 'U'-shaped micro-actuator 404 under principles of the present invention. PZT material has an anisotropic structure whereby the charge separation between the positive and negative ions provides for electric dipole behavior. When a potential is applied across a poled piezoelectric material, Weiss domains increase their alignment proportional to the voltage, resulting in structural deformation (i.e. regional expansion/contraction) of the PZT material. The PZT structures 406 bend (in unison), the Zirconia arms 408, which are bonded to the PZT structures 406 bend also, causing the head/slider 402 to adjust its position in relation to the micro-actuator 404 (for magnetic head fine adjustments). As explained below, the bottom arm 420 is secured to the suspension tongue 412 (by a bonding agent, such as epoxy), maintaining the orientation of the suspension 410.

Figure 5:
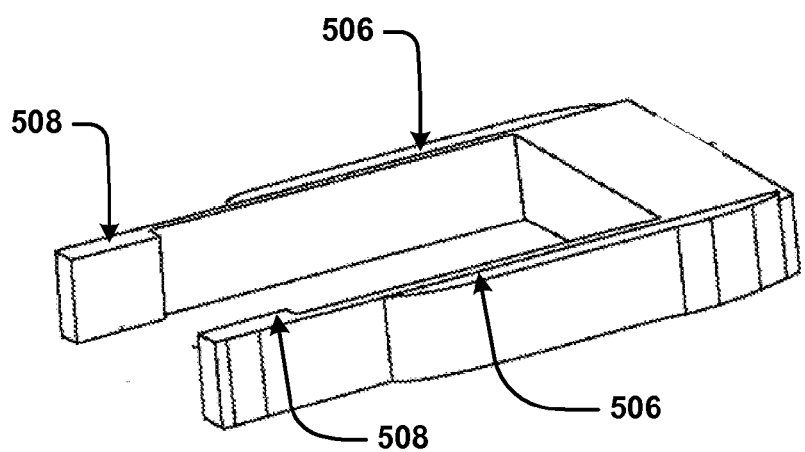
FIG. 5 provides an illustration of a 'U'-shaped micro-actuator for further explanation under principles of the present invention.

FIG. 5 provides an illustration of a 'U'-shaped micro-actuator for further explanation under principles of the present invention. As stated above, when a potential is applied across a poled piezoelectric material, structural deformation (i.e. regional expansion/contraction) of the PZT material results. As the PZT structures 506 bend (in unison), the Zirconia arms 508, which are bonded to the PZT structures 506 bend also, causing the head/slider (not shown) to adjust its position in relation to the micro-actuator (for magnetic head fine adjustments).

FIG. 6 illustrates the process of coupling a micro-actuator to suspension under principles of the present invention. As seen in FIG. 6a and FIG. 6b (bottom view), in one embodiment, a bonding agent 606, such as epoxy, is applied to the bottom arm 608 of the micro-actuator 602, which is bonded to a magnetic head (slider) 604 at two locations 603. As seen in FIG. 6c, a shim 610 of a material such as polyester, polyethylene, or metal (metal flake) is utilized to maintain proper relative alignment between the micro-actuator 602 (and slider 604) and the suspension 612. Specifically, the shim 610 prevents the micro-actuator 602 and slider 604 from shifting during the curing process of the bonding agent to bring them too close to the suspension tongue 614 of the suspension 612 upon bond hardening (under clamping pressure 616), thus preventing potential interference between micro-actuator 602/slider 604 and the suspension tongue 614 (the 'stick-slip' problem). As shown in FIG. 6d, when the micro-actuator 602 is mated to the suspension tongue 614 for bonding, an amount of clamping force 616 is applied to provide proper bond securement during the curing process. The shim 610 maintains correct relative alignment until the bond 606 is cured.

Figure 6A:
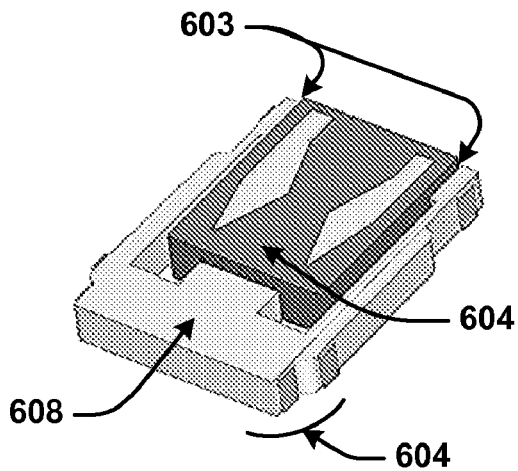
FIG. 6 illustrates the process of coupling a micro-actuator to suspension under principles of the present invention.
Figure 6B:
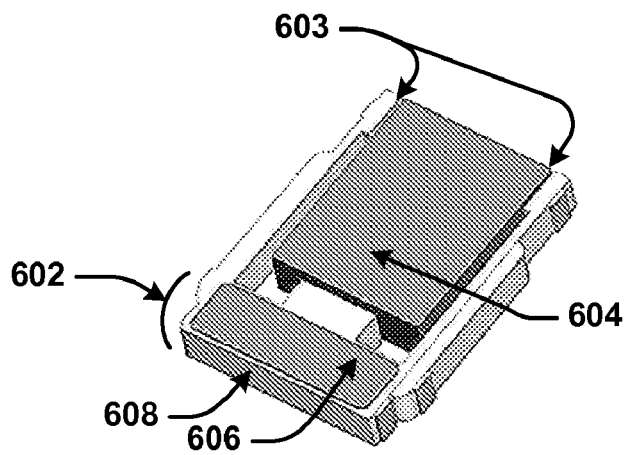
Figure 6C:
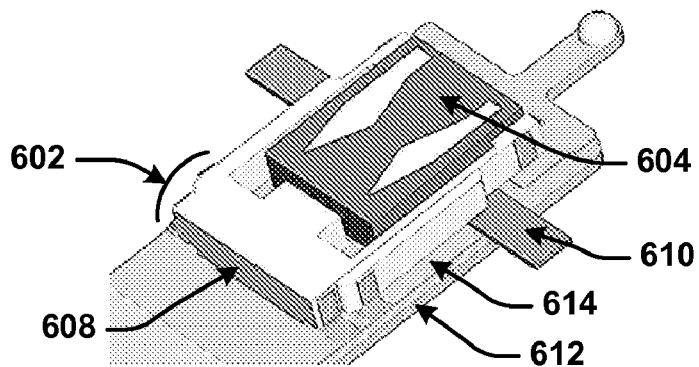
Figure 6D:
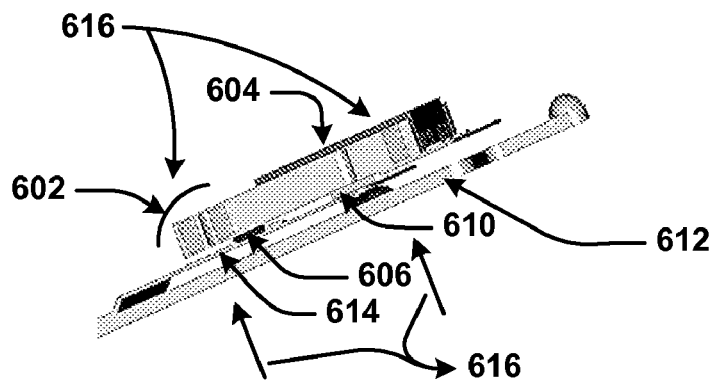
Figure 6E:
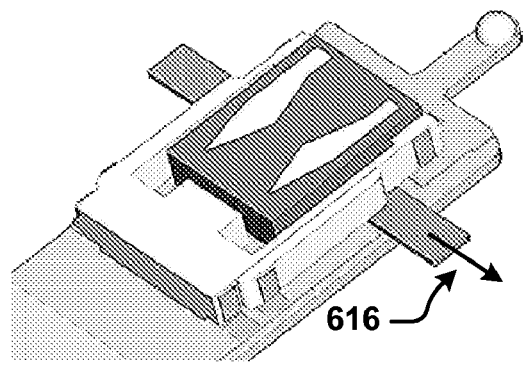
Figure 6F:
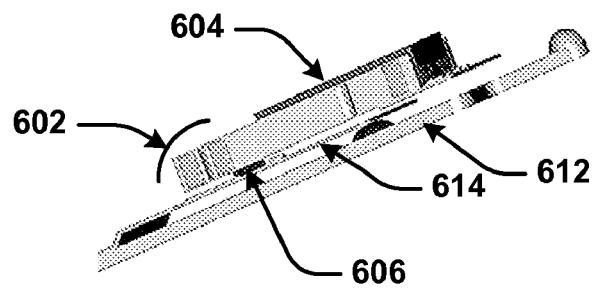

In one embodiment, the shim 610 is inserted between micro-actuator 602/slider 604 and suspension tongue 614 after the micro-actuator 602 and suspension tongue 614 have been mated with the bonding agent 606. In an alternative embodiment, the shim 610 is placed upon the suspension tongue 614 in the appropriate location, and next, the micro-actuator 602 (with attached slider 604) is bonded to the suspension tongue 614, sandwiching the shim 610. As seen in FIG. 6e, after the bonding agent 606/603 is fully cured, the shim is removed. FIG. 6e provides a side view of the assembled device to illustrate the desired spacing between the micro-actuator 602/slider 604 and the suspension tongue 614.

Figure 7:
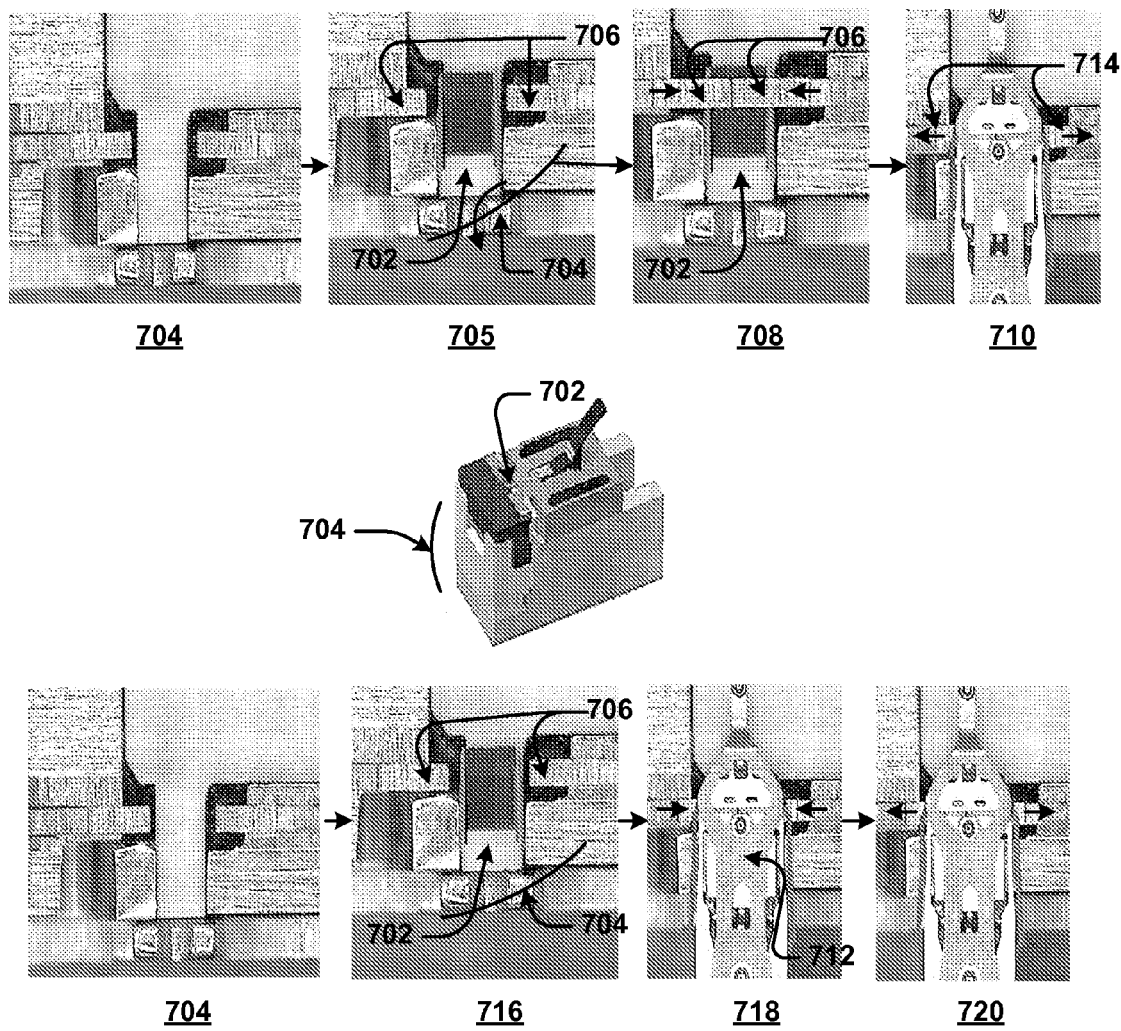
FIG. 7 illustrates two methods of shim placement under principles of the present invention.

FIG. 7 illustrates two methods of shim placement under principles of the present invention. In one embodiment, a micro-actuator 702 is first loaded 706 into a fixture 704. A shim 706 is placed 708 above the micro-actuator 702, and next 710, the suspension 712 is bonded to the micro-actuator 702, sandwiching the shim 706. After the bonding agent is fully cured, the shim 706 is removed 714.

In an alternative embodiment, a micro-actuator 702 is first loaded 716 into a fixture 704. Next, a shim 706 is inserted 718 between the micro-actuator 702 and suspension 712 after the micro-actuator 702 and suspension 712 have been mated with a bonding agent. After the bonding agent is fully cured, the shim 706 is removed 720.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system to couple an actuator element to a suspension element comprising: a removable shim element to be placed at a first location between the actuator element and the suspension element to maintain a relative orientation of the actuator element with respect to the suspension element during a curing process of a bonding agent at a second location between said actuator element and said suspension element, wherein lateral edges of the removable shim element extend beyond lateral edges of the actuator element, the bonding agent, and the suspension element to facilitate removal.

2. The system of claim 1, further comprising:
a slider to be bonded to said actuator element by the bonding agent, wherein said removable shim element is to be placed between said slider and said suspension element to maintain the relative orientation of the slider and the actuator element with respect to the suspension element during the curing process of the bonding agent.

3. The system of claim 1, wherein the actuator element is a micro-actuator.

4. The system of claim 3, wherein the micro-actuator is a piezoelectric, U-shaped micro-actuator.

5. The system of claim 1, wherein the suspension element is a suspension tongue.

6. The system of claim 1, wherein the removable shim element is a polyester film.

7. The system of claim 1, wherein the removable shim element is a polyethylene film.

8. The system of claim 1, wherein the removable shim element is a metal film.

9. The system of claim 1, wherein the bonding agent is epoxy.

10. The system of claim 1, wherein the actuator element is bonded to the suspension element at said first location and then the removable shim element is inserted between the actuator element and the suspension element at said second location until the bonding agent is fully cured, whereupon the removable shim element is removed.

11. The system of claim 1, wherein the removable shim element is placed in said second location on the suspension and then the actuator element is bonded to the suspension element at said first location until the bonding agent is fully cured, whereupon the removable shim element is removed.

* * * * *